United States Patent Office 2,913,818
Patented Nov. 24, 1959

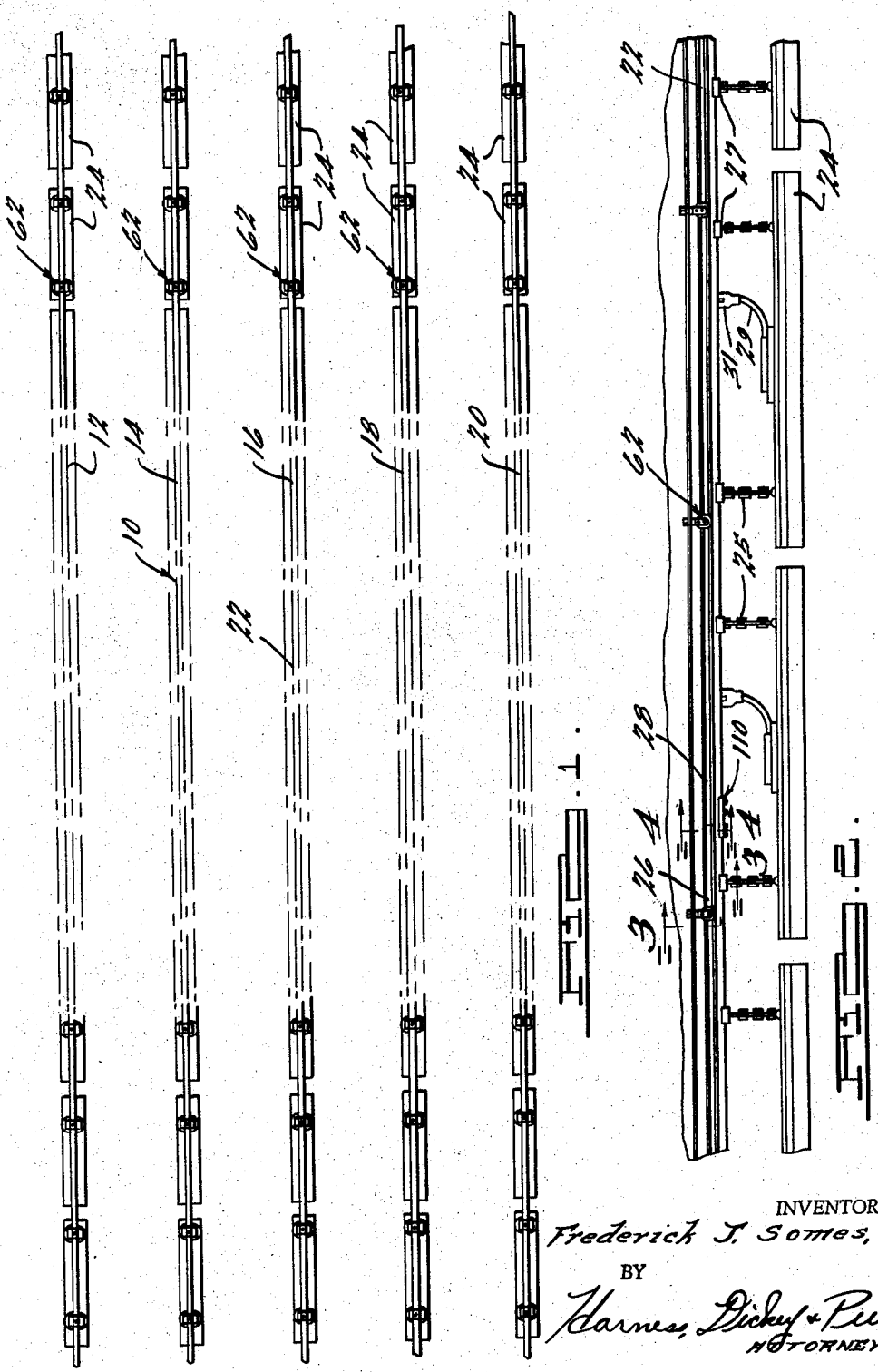

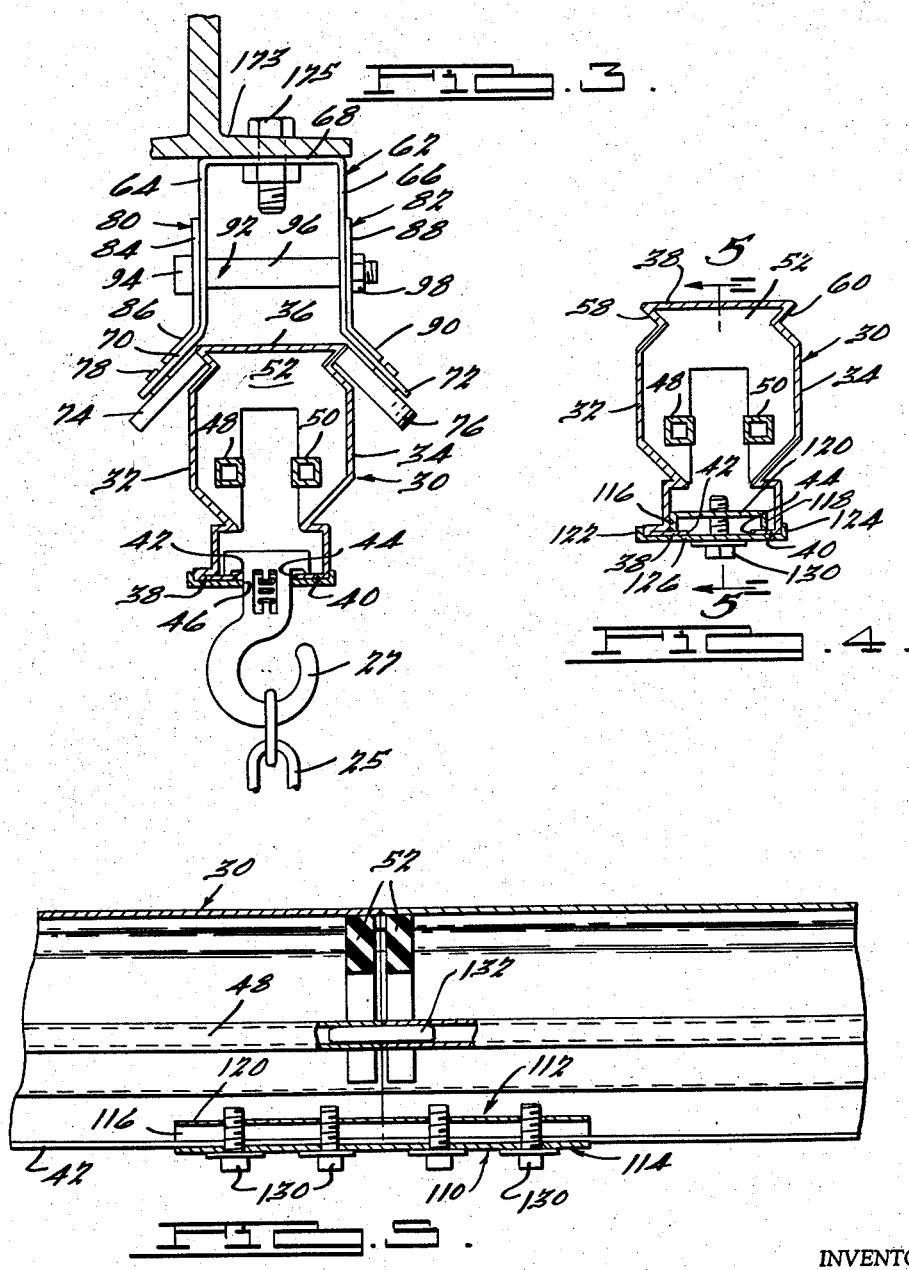

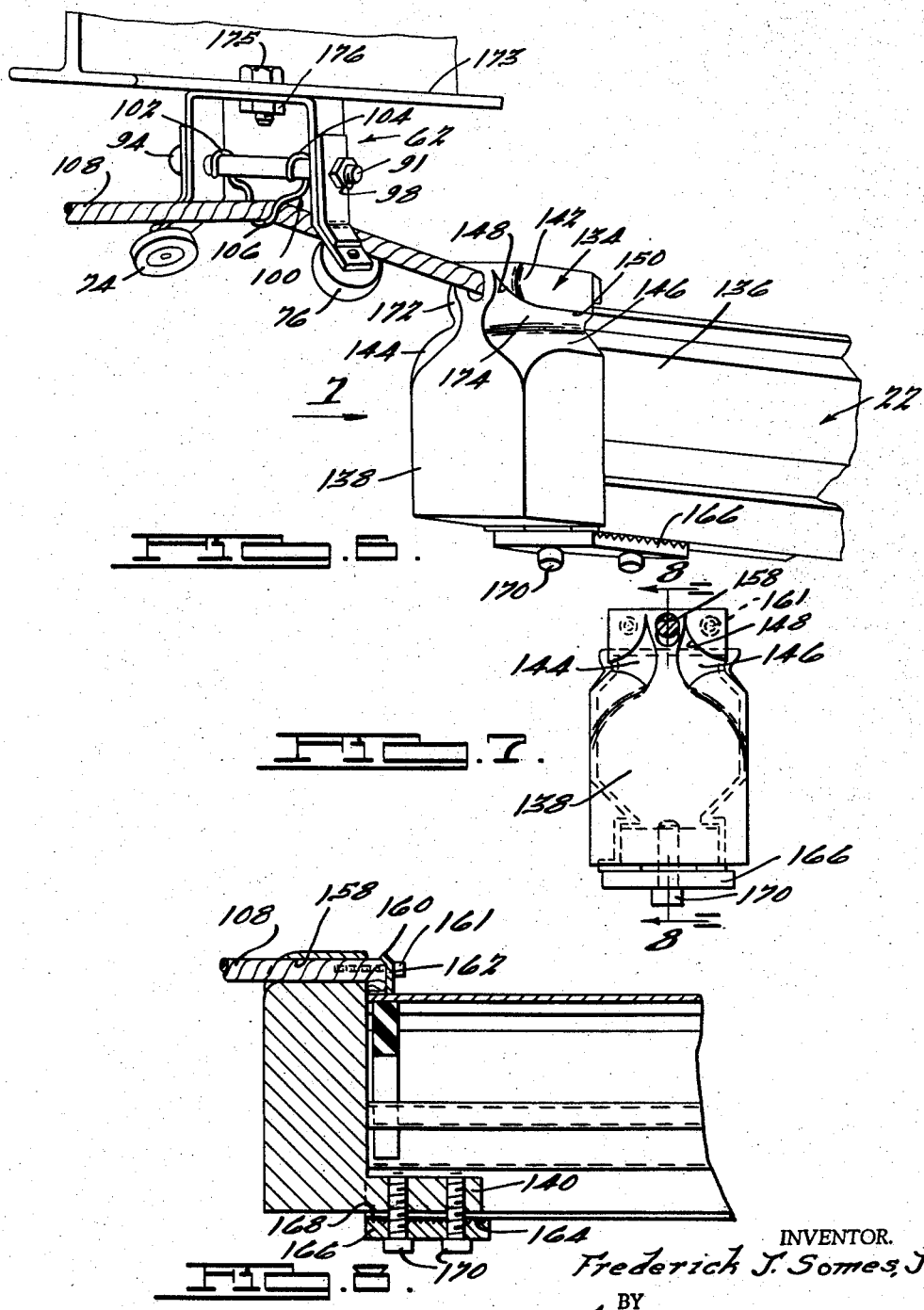

2,913,818

APPARATUS FOR INSTALLING AN ELECTRICAL SYSTEM

Frederick J. Somes, Jr., Detroit, Mich., assignor to General Electric Company, a corporation of New York Original application October 13, 1955, Serial No. 540,230. Divided and this application January 24, 1957, Serial No. 636,094

2 Claims. (Cl. 29—283)

This application is a division of the applicant's co-pending application, Serial No. 540,230, filed October 13, 1955, now abandoned, for Electrical System and Method of Installing the Same.

This invention relates to apparatus for use in installing electric power distribution equipment, and more particularly to apparatus for use in installing such equipment by the "roll-in" method, as set forth and claimed in my aforesaid copending application.

Electric power distribution equipment of the type referred to comprises prefabricated elongated sections of housing or duct, enclosing and supporting a number of bus bar type conductors and adapted to be interconnected in end-to-end relation. According to the general method disclosed and claimed in my aforesaid application, such a system is installed from a single operating station by extending a first section of such duct out along the intended path of the system, movably supporting the projecting portion of such section, connecting a second section or length in endwise relation to the first length, moving the two interconnected sections further out along the intended path, and repeating this operation with successive sections until the desired length of duct is installed.

The invention thus facilitates the rapid installation of a relatively large electrical power distribution system with a minimum of labor, equipment, and expense.

Further, in accordance with the disclosure of the aforesaid application, means is provided for movably supporting the duct comprising a series of spaced stationary supports each having a pair of spaced rollers for cooperation with corresponding spaced ways or guide surfaces on the duct, and the duct is moved by means of a towing cable which is threaded through the supports.

In practicing the invention in this manner, the outer or leading end of the duct must properly pick up and engage the rollers of each of the stationary supports as it goes along. Since the spacing between the rollers is the same as that between the duct guide ways, it is necessary for the end of the duct to be aligned accurately with the rollers in order for it to pick up and engage the rollers properly. Since there is a substantial distance between supports, and since the leading end of the duct is not supported by a relatively fixed or steady means, a certain amount of random movement of the leading end is unavoidable, making it very difficult to properly engage the duct with each roller support.

Is is an object of the present invention to provide means for automatically assuring the proper alignment and interengaging of such a duct and such a support.

It is another object of the invention to provide such aligning and interengaging means which may be easily and dependably anchored to the leading end of a section of bus bar electric distribution duct and which is also adapted to serve as a means for anchoring a towing cable to such duct.

In accordance with the invention in one form, there is provided an adapter or guide block having a part insertable into the duct, and clamping means for clamping part of the duct wall thereagainst. The block also has a pair of guideways on opposite sides corresponding generally to the guideways of the duct. At the face of the block which is clamped against the duct end, these guideways are aligned with and have dimensions corresponding closely to those of the duct guideways. The block guideways diverge, however, from this face toward the leading face, so that at the leading face, the guideways have a substantially greater dimension. Thus a substantial amount of misalignment can occur and the guide block will enter the wide portions of the block guideways and be led accurately into the duct guideways.

Figure 1 is a top plan view of electrical power distribution apparatus embodying the present invention, showing the same installed in an electrical power distribution system;

Fig. 2 is an enlarged side elevational view of a portion of the structure illustrated in Figure 1;

Fig. 3 is an enlarged transverse sectional view of the structure illustrated in Fig. 2, taken on the line 3—3 thereof;

Fig. 4 is an enlarged transverse sectional view of the structure illustrated in Fig. 2, taken on the line 4—4 thereof;

Fig. 5 is an enlarged longitudinal sectional view of the structure illustrated in Fig. 4, taken on the line 5—5 thereof;

Fig. 6 is a perspective view of apparatus embodying the present invention, showing the same during the installation thereof;

Fig. 7 is a front elevational view of a portion of the apparatus illustrated in Fig. 6; and Fig. 8 is a fragmentary longitudinal sectional view of the structure illustrated in Fig. 7, taken on the line 8—8 thereof.

Referring to the drawings, and more particularly to Figure 1 thereof, an electrical power distribution system, generally designated 10, is illustrated which comprises a plurality of spaced, substantially parallel rows 12, 14, 16, 18 and 20 of trolley ducts 22 that are adapted to supply electrical power to lighting fixtures 24 or other electrical equipment. In the embodiment of the invention illustrated, the fixtures 24 are shown as being suspended by link elements 25 which are secured to the trolley ducts 22 by hooks 27, the fixtures 24 being electrically connected to the trolley ducts 22 by conduits 29 and conventional plugs or trolleys 31. While multiple trolley ducts 22 are illustrated, it will be understood that the present invention may be utilized in the installation of only one trolley duct, if desired. Each of the rows of trolley ducts may, for example, extend for several hundred feet, the electrical power distribution system 10 illustrated being particularly adapted for factories and other relatively large buildings.

In the embodiment of the invention illustrated, each of the trolley ducts 22 includes a plurality of sections, such as 26 and 28, which are electrically and mechanically joined together in end-to-end relationship to form a unitary structure, the individual sections being of any desired or conventional length, as, for example, each section may be approximately ten feet in length.

Each section of the trolley duct 22 includes a housing 30 having spaced side walls 32 and 34 joined by a top wall 36. The lower end portions of the side walls, as viewed in Figs. 3 and 4, are provided with inwardly extending flanges 38 and 40, the inner edges 42 and 44 of which terminate in spaced substantially parallel relationship to define an elongate slot 46. The flanges 38 and 40 serve as tracks which extend longitudinally of the housing 30 from end-to-end thereof and upon which conventional trolleys, plugs or other connectors are mounted in the conventional manner.

The housing 30 carries electrical conductors 48 and 50, the conductors 48 and 50 being disposed in spaced relationship with respect to the walls 32, 34, and 36 of the housing. The conductors are also disposed in inwardly spaced relationship with respect to the flanges 38 and 40, electrical insulators 52 being provided which serve to support the conductors 48 and 50 and electrically insulate the conductors from the housing.

At a position adjacent the top wall 36, the side walls are provided with generally V-sectioned longitudinally extending grooves or guideways 58 and 60. The ways 58 and 60 extend longitudinally of the housing 30 for the entire length thereof and are adapted to engage rotatable supporting elements, as will be described hereinafter in greater detail.

For the purpose of supporting the housing 30, a plurality of generally U-shaped support members 62 are provided, each having spaced flanges 64 and 66 integrally joined by a web 68. The free end portions 70 and 72 of the flanges 64 and 66, respectively, project angularly outwardly in substantially mutually perpendicular planes and carry rotatable supporting elements 74 and 76, the rotatable supporting elements 74 and 76 being journaled on pins 78 fixed to the portions 74 and 76 of the flanges 64 and 66, respectively.

A pair of stiffening members 80 and 82 are provided on each support member 62. The stiffening member 80 includes an end portion 84 which is disposed in substantially parallel relationship with respect to the flange 64 and a portion 86 which is disposed in substantially parallel relationship with respect to the portion 70 of the flange 64, while the stiffening member 82 includes a portion 88 which is disposed in substantially parallel relationship with respect to the flange 66 and a portion 90 which is disposed in substantially parallel relationship with respect to the angularly outwardly extending portion 72 of the flange 66. A connecting member 92 is provided which extends transversely of the support member 66 intermediate the web 68 and the angularly outwardly extending portions 70 and 72 of the flanges. The connecting member 92 includes a head portion 94 which engages the stiffening member 80. The connecting member 92 also includes a shank portion 96 which extends through the stiffening members 80 and 82 and the flanges 64 and 66, and the connecting member 92 is retained by a nut 98 which threadably engages the end portion of the shank 96 remote from the head 94 thereof. The connecting member 92 functions to maintain the flanges 64 and 66 in predetermined spaced relationship and also serves to support a guide member 100. The guide member 100 includes a pair of hook portions 102 and 104 and a bight portion 106 which serves to guide a cable 108, as will be described hereinafter in greater detail.

For the purpose of mechanically joining the individual sections of the trolley duct in end-to-end relationship, a plurality of connectors 110 are provided which overlap the adjacent sections of the trolley duct. Each of the connectors 110 includes a generally U-sectioned inner element 112 and a generally U-sectioned outer element 114. The inner element 112 includes a pair of spaced substantially parallel flanges 116 and 118 integrally joined by a web portion 120, while the outer element 114 includes a pair of spaced substantially parallel flanges 122 and 124 integrally joined by a web 126. The distance between the outer surfaces of the flanges 116 and 118 of the inner element 112 is less than the distance between the inner surfaces of the flanges 122 and 124 of the outer element 114, and, as shown in Figs. 4 and 5, the flanges 122 and 124 are adapted to engage the lower ends of the side walls 32 and 34 of the housing 30 at a position adjacent the junction of the side walls 32 and 34 with the flanges 38 and 40, respectively. The inner elements 112 of the connectors 110 are disposed in the housing 30 so as to straddle the slot 46, the free ends of the flanges 116 and 118 being adapted to engage the inner sides of the flanges 38 and 40. A plurality of screws 130 are provided which extend through the web portions 126 of the outer elements and threadably engage the web portions 120 of the inner elements 112. With such a construction, when the screws 130 are tightened, the flanges 38 and 40 of the housing are clamped between the flanges 116 and 118 of the inner element 112 and the web 126 of the outer element 114.

In the assembly of the sections of the trolley duct, one end portion of the connecting member is secured to one end portion of the housing 30, in the manner previously described, after which the adjacent section of the housing is slidably inserted in the other end portion of the connecting member so that the flanges 38 and 40 of the housing are disposed between the inner and the outer elements of the connector, in the manner previously described. The screws 130 are then tightened so as to securely clamp the adjacent sections of the trolley duct in end-to-end relationship.

Any desired or conventional means may be provided for electrically connecting the conductors 48 and 50 of the adjacent sections of the trolley duct. For example, conventional pins 132 may be utilized, the pins 132 being inserted in the end portions of the conductors 48 and 50 in the conventional manner.

In order to facilitate the installation of the trolley ducts, a guide block 134 is provided which is adapted to be secured to the free end of the leading section 136 of the trolley duct. The guide block 134 includes a body portion 138 having a flange 140 projecting outwardly from the lower edge thereof. The guide block 134 also includes a head portion 142 which is integrally joined to the body portion 138 and the transverse dimensions of which are less than the transverse dimensions of the body portion 138. At a position intermediate the head portion 142 and the body portion 138, a pair of guideways 144 and 146 are provided. Each of the guideways 144 and 146 includes a converging section 148 and a substantially straight section 150, the sections 150 being of substantially the same configuration as the grooves 54 and 56 in the housing 30. A passageway 158 is also provided in the head portion 142 of the guide block 134, the passageway 158 being open at each end and adapted to receive the cable 108. A retaining element 160 is releasably secured to the guide block 134, as by screws 161 so as to secure the end 162 of the cable to the guide block 134 so that the guide block 134 and the trolley duct may be pulled through the agency of the cable 108.

In securing the guide block 134 to the free end of the leading section 136 of the trolley duct, the flange 140 of the guide block is inserted intermediate the side walls 32 and 34 of the housing 30 so that the bottom wall 164 of the flange 140 engages the inner surfaces of the flange portions 38 and 40 of the housing, and the flanges 38 and 40 of the housing are clamped between the flange 140 of the guide block and a retaining element 166 having a knurled surface 168 which engages the outer surfaces of the flange portions 38 and 40 of the housing. Screws 170 are provided which extend through the retaining element 166 and threadably engage the flange 140 of the guide block 134 to effect the clamping of the guide block to the trolley duct.

When the guide block 134 is mounted on the trolley duct, the sections 150 of the guideways 144 and 146 are aligned with the ways 58 and 60, respectively, the upper surfaces 172 and 174 of the guideways 144 and 146 being substantially coplanar with the corresponding surfaces of the ways 58 and 60 and constituting a continuation thereof.

In the installation of the electrical power system, the support members 62 are secured to a roof truss 173 or other suitable stationary supporting structure at spaced intervals and in aligned relationship along the proposed rows of trolley ducts, the support members 62 being fixed to the roof truss, for example, by bolts 175 which pass through the truss and the web portion 68 of the support member and threadably engage a nut 176. The hook portions 102 and 104 of the guide elements 100 are hooked over the connecting member 92 of each of the support members 62 so that the bight portion 106 is disposed downwardly therefrom. The cable 108 is then passed through the guide elements 100, as shown in Fig. 6, after which the free end of the cable is passed through the passageway 158 in the guide block and secured by the member 160 to the guide block. The cable extends along the proposed row of trolley duct and a winch or other suitable means is provided at the opposite end of the cable remote from the guide block to facilitate pulling the cable.

The guide block 134 is secured to the leading end of the first section 136 of the trolley duct, in the manner previously described. The opposite end of the first section 136 of the trolley duct is then electrically and mechanically connected to another section of the trolley duct in end-to-end relationship, the mechanical connection being effected by sliding the clamping member 110 onto the housing 30 of each section so that the flanges 38 and 40 are disposed intermediate the inner and outer elements 112 and 114 of the clamping member 110. The bolts 130 are then tightened to complete the clamping of the adjacent sections. At the same time, the pins 132 may be slidably inserted in the conductors 48 and 50 in the conventional manner to electrically connect the adjacent sections. The individual sections of the trolley duct are preferably joined at one location, such as at one end of each proposed row of duct, thereby obviating the necessity of the workman moving from such location during the assembly of the duct.

After the first two sections have been secured together in end-to-end relationship, such sections are pulled toward the nearest support member 62. As the guide block 134 approaches the first support member, the guide elements 100 tend to raise the guide block 134 toward the rotatable elements 74 and 76. It will be appreciated that with an elongate section of trolley duct, the end being pulled by the cable will tend to deflect downwardly away from the support members 30, and the guide elements 100 serve to guide the guide block 134 toward the rotatable elements of the support members. The converging portions 148 of the guideways 144 and 146 initially engage the rotatable elements 74 and 76, respectively. As the guide block moves over the rotatable elements 74 and 76, the ways 144 and 146 align the ways 58 and 60 of the housing with the rotatable elements of the support members, with the result that the ways 58 and 60 easily move into engagement with the rotatable elements as the sections of the trolley duct move longitudinally relative to the support member 62. The rotatable elements 74 and 76, thus, rotatably support the initially joined sections of the trolley duct. The remaining sections of the trolley duct are then successively electrically and mechanically joined to the previously joined sections, and the joined sections are pulled by the cable 108 through the support members 62, the guide block 134 effecting the initial engagement with the rotatable elements of each support member and aligning the ways 58 and 60 with the rotatable elements 74 and 76. As the guide block 134 enters the support member 62, the guide member 100 is pulled free of the transverse member 92 by the guide block 134, one or both of the hook portions 102 and 104 opening to permit this. The guide member 100 may thereafter remain hanging from the connecting member 92 by one end or it may catch on the cable 108, or, in some cases, fall to the floor.

After all of the sections of the trolley duct have been joined together and pulled into engagement with the rotatable elements of the support members, the cable 108, the guide block 134 and the guide elements 100 may be removed and reused. This is possible since the distortion of the hook members 102 and 104 is ordinarily not such as to interfere with its subsequent re-use. The conductors 48 and 50 may, of course, be electrically connected to a suitable source of potential in any desired manner. The light fixtures 24 or other electrical equipment may be installed during the assembly of the trolley duct or may be installed after the trolley duct is in its final position.

While a preferred embodiment of the invention has been shown and described, it will be understood that various changes and modifications may be made without departing from the spirit of the invention, and I therefore intend, by the appended claims, to cover all such modifications as fall within the true spirit and scope of the invention.

What is claimed is:

1. For use in engaging an elongated duct member having a generally rectangular cross section and a pair of opposed longitudinal guideways with a support member having a pair of spaced-apart rollers, a guide block comprising a generally block-shaped body having a generally rectangular cross section and front and rear faces, a pair of opposed generally parallel guideways on opposite sides of said block and extending between said front and rear faces, said guideways having a first dimension at said rear face corresponding to said duct guideways, said guideways diverging from said rear toward said front face to a dimension at said front face substantially greater than said dimension at said rear face, a projection at said rear face of said guide block adapted to enter said duct, and means for clamping a wall portion of said duct against said projection to rigidly attach said guide block to said duct.

2. A guide block as set forth in claim 1, said guide block also including an opening therethrough from said front to said rear face for receiving a towing cable, and clamping means for clamping said cable to said guide block.

References Cited in the file of this patent

UNITED STATES PATENTS

| | | |
|---|---|---|
| 1,108,748 | Hampton | Aug. 25, 1914 |
| 1,903,274 | Watson | Mar. 28, 1933 |
| 2,359,532 | Searle | Oct. 3, 1944 |
| 2,511,762 | Barnett | June 13, 1950 |